May 11, 1937.  H. E. J. LANGKAU  2,080,388
DIRECT CURRENT GENERATOR
Filed July 14, 1934   2 Sheets-Sheet 2

INVENTOR
Helmut Emil Johannes
Langkau.

Patented May 11, 1937

2,080,388

UNITED STATES PATENT OFFICE 2,080,388

DIRECT-CURRENT GENERATOR

Helmut Emil Johannes Langkau, Aachen, Germany, assignor of one-half to Georg Ullrich, Magdeburg, Germany Application July 14, 1934, Serial No. 735,182
In Germany September 25, 1930

7 Claims. (Cl. 171—223)

This invention relates to direct-current generators which, operating at variable potential, supply a constant or approximately constant current intensity, the amount of which can be adjusted as desired by any suitable means.

More particularly it has to do with improved means for removing any lag of the potential increase, these means consisting in magnetic by-paths provided within the stationary part of the generator, and of gaps within these by-paths, these gaps presenting a considerable magnetic resistance to the flux of the lines of the magnetic force.

Such machines are required in particular for electric arc welding, where it is necessary that the potential of the source of current should be always adapted to the variable arc potential without the current intensity thereby varying too much. In particular, in the case of short-circuits, the current should also not be momentarily too great; and above all, on the termination of a short-circuit which precedes the ignition of the arc and during which the machine potential practically falls to zero, the potential of the machine must immediately be re-established.

Direct-current welding generators as at present mostly used, require, however, usually more or less time to adjust themselves from one condition of potential to another. Consequently, there take place in the variations of condition in the welding arc, considerable momentary variations of the strength of the welding current; if these are too great then there occurs, with negligible disturbances, a breaking of the arc and ignition difficulties arise.

In order to moderate these current fluctuations effectively without too great a loss of energy, and in this way to obtain good welding properties of the machines, it is consequently necessary to make the duration of the potential variations as far as possible equal to zero.

The object of the present invention is the production of a machine for constant or approximately constant current, in particular for arc welding, which can vary its electromotive force practically without lag, and in consequence of this property, presents in many respects considerable advantages as compared with previous welding machines.

Special features of the invention will appear as the description proceeds.

Figure 1:
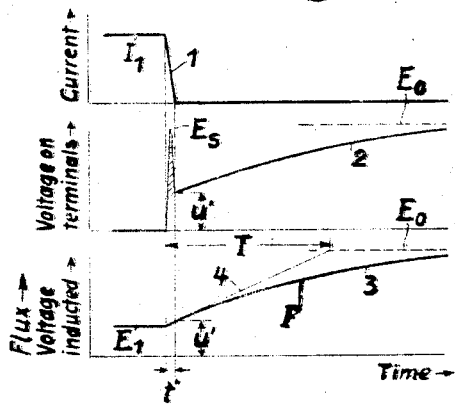
Figure 2:
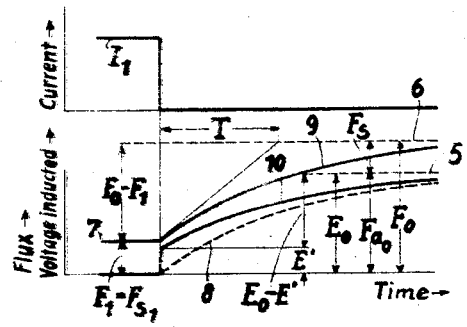
Figure 3:
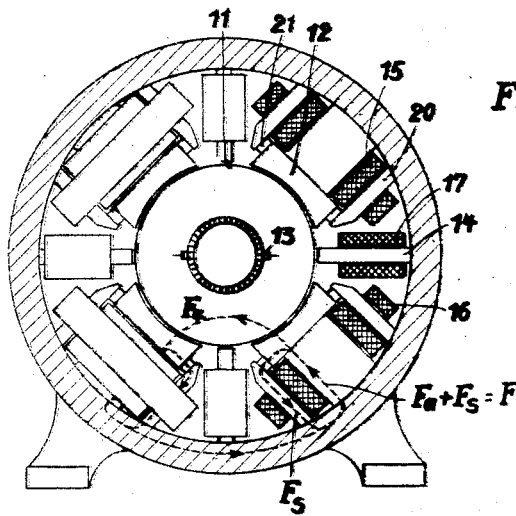
Figure 4:
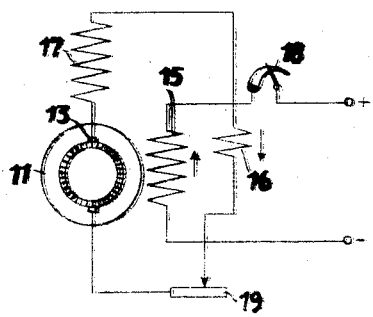
Figure 5:
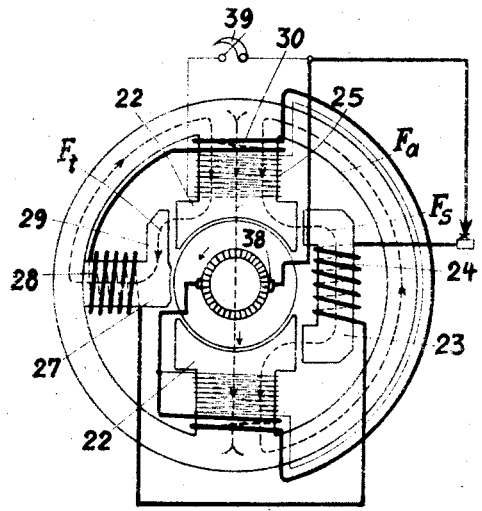
Figure 6:
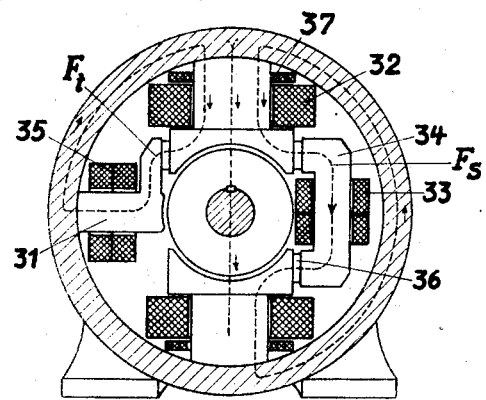
Figure 7:
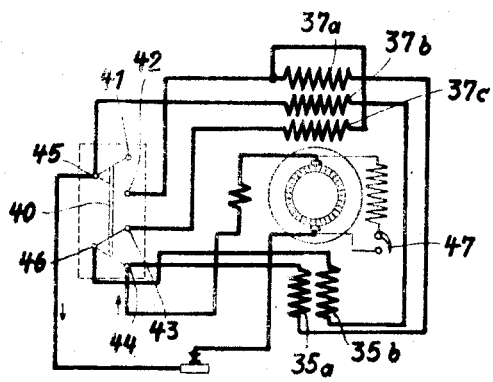

In the accompanying drawings forming a part of this specification, Fig. 1 shows a diagram of the course of current and potential; Fig. 2 shows the same for another course; Fig. 3 shows an embodiment of the invention schematically; Fig. 4 shows diagrammatically the course of the current in a machine according to Fig. 3; Fig. 5 shows another embodiment of the invention; Fig. 6 shows a further embodiment; Fig. 7 shows a diagram representing the course of the current in a machine according to Fig. 6.

As stated above, it is of the greatest importance in attaining good welding properties that the welding dynamo on no load should at once develop a sufficiently high potential again. Return of potential takes place in the case of a current interruption after a previous short-circuit with most machines somewhat in the manner as shown by the switch-out oscillogram of Figure 1. The curve 1 represents the time course of the current strength, and 2 the potential at the terminals.

Before the interruption of the working current, the machine is practically short-circuited, and consequently the terminal potential $u_1=0$ and the short circuit current density $=I_1$. In switching off, there occurs, as in general in the switching off of direct-current fields, in consequence of the self-induction in the current circuit within the machine, a potential peak $E_s$ which for a certain time $t'$, hereafter termed the switch-out period, maintains the flow of the current. On the termination of the switching operation and the current having dropped from $I_1$ to 0, the self-induction potential $E_s$ has, however, disappeared, and the terminal potential then shows a value $u'$ from which it then commences more or less rapidly to rise to the no-load potential $E_0$.

Directly after taking off the load, however, only a fraction of the no-load potential is developed and is available as ignition potential for forming the arc. This potential $u'$ is consequently characteristic of the welding properties of the machine. From the standpoint of weldability in itself, only the absolute value of $u'$ has any importance, but from other points of view it is of great importance in what manner the potential amount $u'$ is produced in a machine.

This potential is composed of the loss voltage $E_v=I_1.r$ released on cutting off the current and which is dependent upon the loss resistance $r$ in the machine and an increase of the E. M. F. by $E'$, that is: $u'=E_v+E'$.

That the loss potential $E_v$ contributes greatly to steady the arc and consequently is frequently increased by special steadying resistances, is known, but a higher proportion of $E_v$ to $u'$ means great current losses and is consequently very uneconomical. In order to obtain good weldability with good efficiency, it is important to make the portion E' of u' which is free of loss as large as possible. If with these machines the immediate E. M. F. variation E' can be so increased that with loss of load u' is approximately equal to the no-load potential, then the potential range of the machine will be fully utilized from the welding practice point of view, and it will be possible to attain good welding properties with no-load potentials and at the same time to work with very favourable efficiency. The machine can also be dimensioned for no-load potentials, which means with the same welding output a smaller, lighter and more economical construction thereof; thus both in the working as well as in the production, considerable economical advantages can be attained if the E. M. F. of the machine can be made as far as possible free from lag within the whole potential range. In this lies the main object of the present invention.

In previous efforts made to attain this, a commencement was made from the view existing at the moment regarding the compensation processes in electrical machines, according to which the E. M. F. followed, in the process according to Figure 1, a curve having an exponential law. Here the E. M. F. curve, as shown in the figure, is determined by the initial value $E_1$ and the final value $E_0$ of the voltage, and the time constant T which determines the initial tangent 4 of the function. If $E_1$ and $E_0$ be regarded as machine constants, then an increase of E' is only possible by influencing the time ratio $t$. If $t$ is small as compared with T, then E' will be reduced as compared with $E_1=E_v$, so that the welding properties of the machine are almost exclusively determined by its loss resistance, and in this case the machine must be made very large for good weldability and will consequently show heavy losses.

As is known, it has been thought by increasing the self-induction in the welding current circuit by means of choking coils, to increase the switch-out period $t$, and in this way to facilitate the potential return. To attain any appreciable effect in this respect, however, very large and heavy choking coils are necessary which, in addition to noticeable additional losses, also increase costs of manufacture.

There is against the effort to reduce the time constant T of the machine rise, the difficulty, in the case of machines hitherto used, that, in order to increase the induced E. M. F., a corresponding number of magnetic lines of force must be freshly created. This fresh building up or the acceleration of the fresh building up of lines of force necessitates a consumption of energy which is finally only possible by increasing the excitation output, which brings with it fresh losses and thus an unfavourable utilization factor of the machine. Thus, for example, machine systems which show a relatively small time constant, as, for example, transverse field machines are, in comparison with their size, only slightly utilized.

The present invention proposes, contrary to the processes hitherto used, not to attain an acceleration of the fresh assemblage of energizing lines of force. In it the basis is rather an entirely different time curve to that shown in Figure 1, curve 3, of the E. M. F., in which the time values T and $t'$ have only an unimportant influence upon the value of E'. The invention is based rather upon the recognition that under special circumstances the leakage of the exciter winding favourably influences the potential return. This appears for example in a machine, as it is shown in Figure 3 as an embodiment of the present invention. In this figure, 11 is the rotary armature, 12 the exciting main poles, 13 are the brushes, 14 the reversing inter-poles, 15 the exciter winding of the main poles, 16 the main current winding acting against the winding 15, 17 the winding of the interpoles, and 18 a regulating resistance in the current circuit of the exciter winding 15 for adjusting the strength of the welding current at the spot of operation 19.

This machine operates with separate excitation, and by means of the anti-compound excitation produced by the winding 16 a characteristic of the machine can be obtained as it is necessary for operating with the arc. As a new feature, the machine shows special iron bodies 20 outside the exciting winding 15, these bodies being composed of thin sheets and forming by-paths for the flux of the magnetic lines of force to lead them around the armature 11. The leakage flux $F_s$ of these lines causes the potential to return immediately and without lag, as more particularly described in the following paragraph.

The dynamic results on sudden relief from load in the case of a machine according to Figure 3 are represented in Figure 2. For the sake of clearness, the loss potential $E_v$ on short-circuit, as also the self induction, are neglected; in this case, on switching out, the disappearance of the current $I_1$ takes place quite suddenly, so that the time value $t'$ is dispensed with; the stable condition values are provided, as in Figure 1, with the index $o$, and on short-circuit with the index 1.

In Figures 2 and 3 the productive energy flux in the armature is indicated by $F_a$; $F_s$ is the leakage flux passing around the armature by by-paths, and $F=F_a+F_s$ the total flux of lines of force of the exciting winding. Since, in machines of constant speed, the E. M. F. is proportional to the magnetic flux $F_a$ operating, the time curve thereof in Figure 2 represents at the same time the E. M. F.

On a short-circuit the E. M. F. $E_1$ and with it $F_{a1}=0$ with the loss-free machine here considered. If the leakage $F_s$ is not taken into consideration, then on relief from load the magnetic flux must be freshly built up from 0 to the no-load value $F_{a0}$, which is represented by line 5 in Figure 2. This value would proceed in point of time to an exponential function, according to the curve 8. Directly after interruption of the armature or working current, therefore, the leakage-free machine would be still entirely without potential.

The anti-compound winding in the armature, acting as reactive ampere turns, comprise, as shown by Figure 3, simply the armature magnetic flux $F_a$, while the leakage flux $F_s$ which every machine must to a certain extent possess, is only linked with the exciting winding and consequently is left free on loading from the influence of the anti-compound winding. On short-circuit, consequently, only $F_a$ is thereby destroyed, while $F_s$ will in the case of a short-circuit remain exactly as large as with no load, since the strength of field of the external excitation producing the same is alike in both cases. Consequently, with a short-circuit, the total magnetic flux is not 0, but there remains a balance value $F_1=F_{s1}$. This value is shown by section 7 of curve 9 in Figure 2. Line 6 represents in this case the no-load value of the total magnetic flux.

On release from load, the equalizing process for F between $F_1$ and $F_0$ will take place according to an exponential function determined by the time constant T, represented by the bow portion of the curve 9. Since at the instant of the interruption of the armature current the reactive ampere turns disappear, which in the case of a short-circuit prevent the passage of lines of force of the exciter field through the armature, the exciting flux F will at once, on switching out, be distributed over the branches $F_a$ and $F_s$ in that proportion which is determined by the magnetic reluctances on no-load. Thus, by the transfer of leakage lines of force into the armature, there will be produced a magnetic flux therein which will make up the same proportion of the total magnetic flux F as on no-load. Corresponding to $F_a$, the E. M. F. on the switching-out process will not gradually rise according to the curve 8, but increase at first suddenly to a value E' and from there will rise proportionately to the total magnetic flux F to the no-load value $E_0$, according to curve 10.

The potential increase E' is free from inertia and without lag as it necessitates no fresh creation of lines of force requiring consumption of energy and thus dependent upon time, but is effected by changing the position of lines of force already existing, for it is only of importance for the exciter winding to keep the value of F constant during the switching process, that is, during the interruption of the armature current, while it exercises no direct influence upon the other course of the lines of force.

On sudden loading, on the other hand, there takes place in consequence of this effect of the leakage, an immediate reduction of the E. M. F. As is known, there are created, on the closing of the armature current circuit during the switching-in process, forces in the exciter winding which tend, under all circumstances, to maintain the magnetic flux linked with them constant at the moment of switching. With a leakage-free machine, the E. M. F. can only gradually fall to the fresh potential condition corresponding to the behaviour of F, and the machine will consequently develop very high temporary current impulses.

With a machine having leakage packets according to Figure 3, however, the E. M. F. does not directly depend on F, and at a sudden loading respectively at a short-circuit it happens that a considerable portion of the exciting field $F_a$ immediately shifts into the leakage packets 20, causing thereby an immediate corresponding decrease of the E. M. F.

The cause of this lies in the fact that the anti-compound winding decreases only the portion $F_a$ of the flux F, that passes through the armature, while it does not decreasingly act upon the portion $F_s$ forming a circuit which is closed in itself within the anti-compound winding 16, but is not linked with the latter, as may be seen in Figure 3. By the lag of the complete flux F, a portion of $F_a$ is pushed off at a loading by the effect of the anti-compound winding into the packets 20, so that $F_s$ correspondingly increases.

The described action of the leakage does not appear when the lines of force of the flux $F_s$ are not linked with the main current ampere turns weakening the field, that is with the anti-compound winding 16, as in this case $F_a$ cannot vary independently of F. Therefore, the leakage packets 20 at Figure 3 are arranged between the exciter winding 15 and the anti-compound winding 16, and they must not be arranged outside the latter.

The effect of such a leakage flux which, as shown, influences extremely favourably the potential behaviour of welding machines, can be summarized in a graphic manner by saying that the leakage field is, to a certain extent, an accumulator of lines of force which on a sudden loading takes up a portion of the armature magnetic flux and, a relief from load, serves as a reserve for increasing the potential.

The value of the potential returning without lag depends, as easily may be seen, on the amount of the leakage ratio $\delta$. This value is referred to by E; to increase the leakage of the exciting field for attaining such return as quick as possible is the main object of the present invention and this effect is reached best by applying special leakage packets and leakage bodies as shown in Figure 3. As these bodies are composed of thin sheets of iron, the flux of the lines can change within them as rapidly as possible and without any waste.

This can be attained in the same way with machines the decrease of the field of which at a load is not effected by means of an anti-compound winding, but by reacting turns in the armature, as such may be received, as known, by shifting the brushes from the neutral zone. The action of the leakage flux on the return of the potential is in this case exactly the same as described before.

As can be seen from the drawings, there are gaps in the path of the lines of the leakage flux $F_s$, these gaps presenting a considerable magnetic resistance to that leakage flux and limiting it at the same time, while otherwise the limitation of the amount of the leakage flux would take place by the saturation of the iron in the leakage packets. These gaps are filled up with pieces 21 of solid non-magnetic material; this presents the advantage that the leakage packets can be properly fixed so that they resist the forces which tend to attract the packets on to the pole, and furthermore the size of the gaps can be properly adjusted by employing broader pieces and bending the leakage packets which are a little resilient.

Owing to these gaps in the magnetic by-paths, a machine according to the present invention differs both externally, as also in the method of working, from hitherto known types of machines in which there are also provided magnetic by-paths for the artificial increase of the leakage. In hitherto known arrangements where iron bodies have been arranged around the exciting coils as magnetic by-paths, the essential point consisted in the method of operation in the movable arrangement thereof; the by-paths were there provided for the purpose of being able, by the magnetic short-circuiting of more or less lines of force of the exciting field, to adjust the current densities in various ways. The novelty in the present invention consists in that, by the aid of the leakage magnetic fluxes created in iron bodies so arranged, the potential lag is counteracted and, in particular, an immediate potential return after short-circuit is attained, as has been shown above.

The effect of the leakage magnetic fluxes in this respect is, in the above-described embodiments, dependent upon the sizes thereof, and in order to obtain large leakage fluxes for a marked effect, correspondingly large iron masses are necessary, which increase the weight of the machine.

It will now be described in what manner the leakage can be made still more effective so that the supplementary magnetic leakage fluxes do not need to be too great and considerable iron masses are not necessary in order to obtain a potential return practically without lag. In particular, the object aimed at is to obtain favourable conditions in this respect with self-excited machines; for hitherto known machines with self-excitation develop, after interruption of the short-circuit initiating the ignition of the arc, the necessary ignition potential only very slowly, so that with such machines satisfactory welding could not up to the present be carried out, this being only possible by the aid of high series resistances (steadying resistances) which are unsatisfactory in every respect.

With ordinary self-excited shunt-wound machines, however, the effect of artificial leakage fields would be much less than with machines with separate excitation and main-current counter excitation. For, in contradistinction to these, self-excited shunt-wound machines have at low potentials only a small exciter field strength; since, however, the amount of the leakage magnetic flux also depends upon this, on a short-circuit where the machine has practically no exciter field, there are only very few leakage lines of force. Even with a large leakage ratio $\delta$ consequently, no considerable immediate potential increase can take place on the interruption of the short-circuit, since during the short-circuit no lines of force have been accumulated for this purpose in the leakage fields.

So, at a low potential, respectively at a short-circuit the leakage flux is but small, corresponding to the small strength of the exciter field; on release from load this flux can not immediately produce a potential of some importance.

Furthermore, the leakage has even, on sudden loading, almost no damping effect at all upon the current peaks, as the naturally existing small armature reaction opposes but little more resistance to the magnetic flux $F_a$ in the armature than on no-load, so that only a very small number of lines of force have any inducement to diverge from the armature into the leakage path and consequently an immediate drop of the E. M. F. does not practically take place at all.

When the machine is required on release from load immediately to develop a sufficient high potential value, it is important that, on low potential, that is on short-circuit, a large leakage magnetic flux is available as a reserve field for the production of potential. If it is now possible for the leakage flux on load or short-circuit to be greater than on no-load, in this way the total magnetic flux of the exciter winding can be maintained, by means of which, in the case of sudden release from load there is immediately available a proportional no-load potential. The full no-load potential, that is, a complete avoidance of potential lag, will be at once obtained where the particular case arises that F in the case of a short-circuit is equal to the total magnetic flux with no load, that is $F_k = F_0$. Such a supplementary increase of the leakage with load is the object of the present invention. According to it, this promotion of the leakage is obtained by supplementarily exciting the leakage flux $F_s$ by means of the main-current. With a machine having leakage packets, this can be attained by a main-current winding which is arranged around the leakage packets and through which the load current flows in such a sense that the leakage flux is strengthened.

Figure 5 shows the system of a two-pole machine with a leakage excited by the main-current; between the exciter poles 22 the leakage packet 23 is arranged in tangential position; this packet 23 is surrounded by the main-current winding 24 which acts on the lines of force in such a manner as to produce in the packet 23 at a load the flux of lines referred to by $F_s$ in the Figure 5. The packet 23 consists of a layer of iron sheets in order to prevent the rising of whirling currents, as might be excited in the packet 23 when the main current traversing the winding 24 changes quickly.

It is already known to bridge over the pole pieces of two adjacent exciter poles by iron bodies and also to around these by special main windings. What is novel in the present invention, however, is the use of the arrangement here described with arc welding machines, and to use it for destroying the lag of the E. M. F.

Constructions according to the present invention differ also from embodiments already known by the use of gaps, since such gaps are not hitherto employed for presenting magnetic resistances to the lines of force which is here necessary, contrary to other similar constructions, in order to avoid a saturation of the iron in the packets. In particular the present construction and its action differs from those of similar character already known by the fact of the main current producing lines of force which at the same time pass through the main pole core and yoke, while in the said known constructions the main-current winding produces in the working of the generator lines of force which take the opposite direction in the packets to that in the machine according to the invention, and thus are there closed not through the main pole core and yoke, but through the armature.

The action of the leakage packets with supplementary main-current excitation results on sudden short-circuit of the machine, in the exciter field being drawn immediately, by the ampere turns of the short-circuit current created, out of the armature into the leakage packets. An immediate disappearance of the potential is thereby attained, so that the occurrence of unusually heavy current impulses becomes impossible.

The action of the leakage packets energized by the main current can be imagined by supposing that opposite poles are produced at their ends which, to a certain extent, counter-balance the magnetic action of the main poles. Contrary to the effect of a differential anti-compound winding, however, this so-called pole or magnetic flux compensation does not stop the exciter magnetic flux F, but allows it actually to persist without, however, appearing outwardly. If, as above mentioned, the difference of the exciter magnetic flux for different potential conditions is completely compensated by the increase of the leakage, then there exists complete pole compensation. If the action is less, then there is only a partial or under-compensation.

By increasing the leakage field excitation, the result may be attained, that, on load, $F_s$ increases more than $F_a$ decreases so that consequently the total magnetic flux F in the case of a short-circuit has a higher value than on no load. In this case, there is excess compensation and, on switching out of the short-circuit, the no-load potential E' immediately returning will be greater than the stationary no-load potential $E_0$. Here, then, success may be attained with conditions which are entirely contrary to the hitherto known connection between static and dynamic characteristics. If, in a machine with interpoles, the course is considered of the leakage lines of force occurring naturally, it will be found that, for instance in a machine according to Figure 3, between the main pole pieces 12 and the inter-pole 14 following in the direction of rotation an extremely strong leakage flux is formed at a load, since the inter-pole 14 has opposite magnetic polarity as compared with the main pole 12. This leakage flux between main pole and inter-pole which is referred to by $F_t$ will increase when the load increases, as it depends on the ampere-turns of the inter-pole. Thus it is possible by the aid of this leakage flux to produce in the desired manner a magnetic flux compensation. In the case of the present invention, the leakage between the main pole and the inter-pole following in the direction of rotation is for this reason artificially increased. In the embodiment shown in Figure 5 the main pole shoe is referred to by 22, the inter-pole by 27, and the inter-pole winding by 28. 29 is an iron tooth secured to the interpole, for enabling the leakage flux $F_t$ to rise in the desired manner. The core and the tooth of the inter-pole may be formed of an undivised piece or of a layer of sheets each of which has the undivised shape of core and tooth. The flux of lines $F_t$ closes then through the main pole core and yoke, as shown.

It may be understood that the same arrangement of an inter-pole tooth can be used in machines where inter-poles are applied to all main poles; but the effect of an inter-pole tooth is not so strong as that of a leakage packet like 23, since such packet acts on both of the neighbouring main poles, while an inter-pole tooth forms a leakage field only to one of the neighbouring main poles. But since for the commutation inter-poles can not wholly be dispensed of, the construction according to Figure 5 is most advantageous, such machines having partly inter-poles and partly leakage packets between the main poles.

Figure 6 represents a section through a machine of a similar construction. The interpole 31 consists of a layer of thin iron sheets, each of which has in an undivised piece the form of core and tooth. From this Figure 6 the arrangement of the exciter winding 32, of the auxiliary winding 33 surrounding the packet 34, and of the inter-pole winding 35 may be recognized. In the paths of the lines of force of the leakage fluxes $F_s'$ and $F_t'$ there are gaps being filled up with pieces 36 of solid non-magnetic material.

It is in itself known for other purposes to connect the inter-pole on one side magnetically with the main pole piece. As compared with such already known embodiments, the provision of an inter-pole leakage tooth according to the present invention differs in particular in that there is, in the path of the lines of force of the leakage flux created between the main and the inter-pole, a magnetic resistance in the form of a gap, while the previous known constructions have the main and inter-pole piece made in one piece.

A machine of the type according to Figure 5 or 6 has, even when working as a self-excited shunt-wound machine, excellent welding properties; the invention consequently presents the great advantage that the exciting machine necessary with many other types of machines can be entirely dispensed with.

A purely shunt-wound machine has, however, the property of entirely losing current on continued short-circuit, which naturally is not exactly of advantage for machines for producing an arc. In order to obtain, to some extent, a stable short-circuit current, there is fitted, in the machine according to the invention, a weak compound winding, referred to by 30 in Figure 5 respectively by 37 in Figure 6. On short-circuit where the shunt winding, in consequence of the failure of the motive terminal potential, carries no current, the machine is then kept by the compound winding under excitation to just such an extent that the flow of a sufficiently powerful short-circuit current takes place. The advantage is thereby secured that the arc, not only after a very temporary, but also after a continuous short-circuit, is ignited with certainty; consequently, it is possible with such a machine to avoid crater formation and properly to fill up holes and the like.

The auxiliary excitation by the main current can also be attained by shifting the brushes out of the neutral zone in the direction of rotation, instead of by a weak series-shunt winding. Figure 5 shows the diagram of connections in principle of the machine. The main current flows consecutively through a compound winding 30, the inter-pole winding 28 and the auxiliary winding 24. In the shunt current circuit, which is connected directly to the brushes 38, there is located the shunt regulator 39 and the exciter winding 25.

A machine according to this principle offers special advantages with respect to the regulation of the welding current density. The current regulation can, of course, take place, as with other classes of machines, by means of the regulating resistance 39 in the field current circuit. But the range of regulation is limited towards the bottom, as with weak excitation the no-load potential drops sharply and thus the welding properties are unfavourable with small current densities.

It is now possible by means of the auxiliary fields themselves to attain a particularly favourable influencing of the welding current densities produced. This is based upon the fact that the auxiliary fields automatically prevent increase of the current densities above a certain value, since the leakage fields, when they attain a certain value, cause saturation in the main pole core.

Since now the number of the lines of force of the auxiliary fields depends upon their excitation, that is upon the ampere turns acting upon them, by a variation of the number of turns of the auxiliary winding, the current density is also different, which is necessary for the absorption of the same number of lines of force. With a different number of turns, there will be consequently a different density of current. In this way, therefore, the welding current density may be regulated by varying the effective number of turns of the auxiliary winding.

It may be mentioned that, in other classes of machines which work with series-shunt excitation and also in machines with differential compound winding, the current regulation has already been effected by altering the active number of turns, but as compared with these there is an entirely different action in the machine having auxiliary fields. There is, furthermore, the advantage that, at all current stages which are obtained by this regulation, working is carried out with the same magnetic fields and consequently the welding properties are quite as good with small as with large current densities.

The variation of the active number of turns may, for example, take place by the auxiliary winding—24 in Figure 5 or 33 in Figure 6—being tapped and more or less coils being switched in. The more turns of the winding having current flowing through them in series, the lower will be the adjusted current density. The interpole winding, as 28 in Figure 5, may be dealt with in the same way as with the auxiliary winding, whereby the action of the inter-pole leakage flux $F_t$ may be influenced in the same way as in the other case.

A fine stage current regulation by variation of the effective number of turns is, however, very troublesome, since for this very many conductors and complicated switching devices are necessary. It is, therefore, advisable only to carry out variations of the effective number of turns of auxiliary or inter-pole windings in such way that a few coarse stages are attained in this manner, while fine regulation is carried out by means of the regulating resistance 39 in the shunt circuit.

In order, on the other hand, to be able properly to utilize the conductor sections of the coils with different loads, it is advisable to subdivide the windings into two or more parts with like number of turns, which can be connected in parallel or in series with each other. With parallel connection there is then obtained the stage "heavy", and with series connection the stage "light".

If the auxiliary winding as well as the interpole winding are subdivided in two equal parts, the single parts can be connected for forming two groups of coils; these groups can be switched over in series or parallel in the usual manner by means of a double-pole change-over switch. When being switched in series (=stage "light") the effective number of turns in the windings is double that of being switched parallel (=stage "heavy").

This can be seen in Figure 7 which shows the diagram of connections in the machine represented in Figure 6. The turns of the interpole-winding being subdivided in two parts, they are illustrated by the zigzags 35a and 35b, while the auxiliary winding turns, being subdivided in three groups, are shown by 37a, 37b, and 37c, the groups 37a and 37b being equal.

The windings 35a and 37a are arranged in one circuit the ends of which are connected with the terminals 42 and 44 of the double-pole change-over switch 40; the windings 35b and 37b are arranged in another circuit which is connected to the terminals 45 and 46 of the switch 40. The third auxiliary winding 37c forms an individual group, its ends being connected to the terminal 43 of the switch 40 and to the winding 37a.

In the switch position illustrated in the drawings the current arriving at the terminal 44 flows consecutively through the turns 35a and 37a, the third auxiliary winding 37c, the commencement of which is connected directly to the end of the winding 37a, and from the terminal 43, passing through the switch to 46, where it reaches the other group of windings formed by the turns 35b and 37b for coming to the return conductor 45. The switch contact 41 is blank.

In the other switch position, the contacts 44 and 46, as also 42 and 45, are connected together, so that the groups formed by the coils 35a and 37a respectively 35b and 37b are connected in parallel with each other. Since the contact 43 is then open, the group 37c remains without current.

This arrangement with the third auxiliary winding group has the advantage that the current range "light" can thereby be extended.

By a suitable selection of the number of windings of the third group, it is possible to place the high current density of the stage "light" in the vicinity of the minimum current density of the stage "heavy", adjustable in practice by means of the shunt regulator 47. The result is thereby attained that the ranges of "heavy" and "light" do not overlap more than is necessary and in the range of "light" very small current densities can be adjusted, whereby the machine accordingly may be used both for the welding of thick material as also of thin plates with advantage and with the most simple manipulation.

While one embodiment of the invention has been described with considerable detail, and some alternative types have been indicated, it will be understood that other devices may be used for producing a direct-current of constant or approximately constant intensity, when operating at variable potential, and other obvious changes may be made within the scope of the appended claims.

I claim:

1. In an electric generator of the kind described, the combination of a stator and a rotary armature, magnetic pole cores provided in said stator, windings surrounding said cores for exciting them when being traversed by a separately excited current, means for removing a lag of the potential, said means consisting in iron bodies arranged in tangential position between said pole cores and being surrounded by windings adapted for being traversed by the main current of the generator in such direction as to increase the density of the leakage lines of force passing through said iron bodies.

2. In an electric generator of the kind described, in combination, a stator and a rotary armature, magnetic pole cores provided in said stator, windings surrounding said cores for exciting them when being traversed by a shunt-excited current, means for removing a lag of the potential, said means consisting in iron bodies arranged in tangential position between said pole cores and being surrounded by windings adapted for being traversed by the main current of the generator in such direction as to increase the density of the leakage lines of force passing through said iron bodies.

3. In an electric generator of the kind described, in combination, a stator and a rotary armature, exciting main pole cores in said stator and half as many commutating pole cores as main pole cores, each commutating pole core being provided with a tooth applied to the pole shoe and extending against the pole shoe of that main pole core which precedes in the direction of rotation, and iron bodies between those main pole cores between which no commutating pole cores are arranged, said iron bodies being surrounded by windings traversed by the main current.

4. In an electric generator of the kind described, in combination, a stator and a rotary armature, main pole cores and commutating pole cores in said stator, said commutating pole cores being half as many as the main pole cores, iron bodies provided between the main pole cores where no commutating pole cores are arranged, the main pole shoes and the commutating pole shoes being adjacent to each other without adjoining themselves, said main pole cores being surrounded by a main current winding.

5. In an electric generator for producing continuous current for arc welding, in combination, a stator and a rotary armature, exciting pole cores, commutating pole cores, and leakage packets provided in said stator, said leakage packets being arranged close to said commutating pole cores and extending against that exciting pole shoe which precedes in the direction of rotation without adjoining this shoe, windings adapted for being passed by the main current, said windings surrounding the commutating pole cores as well as the leakage packets.

6. In an electric generator of the kind described, in combination, a stator and a rotary armature, exciting pole cores provided in said stator, shunt-excited windings and windings adapted to be traversed by the main current in the same direction as said shunt-excited windings, half as many commutating pole cores as main pole cores, leakage packets arranged between those exciting pole cores where there are no commutating pole cores, windings surrounding the commutating pole cores and the leakage packets and being adapted to be passed by the main current in series.

7. In an electric generator of the kind described, in combination, a stator and a rotary armature, main pole pieces and commutating pole pieces in said stator, said commutating pole pieces being half as many as the said main pole pieces, iron bodies provided between those main pole pieces between which no commutating pole pieces are arranged, said iron bodies being surrounded by windings traversed by the main current, each of said windings of said iron bodies and of said commutating pole pieces being subdivided in two sections, corresponding sections of said windings being connected in series in two groups, means for coupling said groups, said means consisting of a double-pole switching arrangement adapted to connect the said groups in series or parallel.

HELMUT EMIL JOHANNES LANGKAU.